US012641426B2

(12) United States Patent     (10) Patent No.:   US 12,641,426 B2

Nair     (45) Date of Patent:   \*May 26, 2026

(54) RADIO LINK RECOVERY FOR USER EQUIPMENT

(71) Applicant: NOKIA TECHNOLOGIES OY, Espoo (FI)

(72) Inventor: Suresh P. Nair, Whippany, NJ (US)

(73) Assignee: NOKIA TECHNOLOGIES OY, Espoo (FI)

( \* ) Notice: Subject to any disclaimer, the term of this patent is extended or adjusted under 35 U.S.C. 154(b) by 0 days.

This patent is subject to a terminal disclaimer.

(21) Appl. No.: 18/800,762

(22) Filed: Aug. 12, 2024

(65) Prior Publication Data

US 2024/0406728 A1     Dec. 5, 2024

Related U.S. Application Data

(63) Continuation of application No. 17/976,047, filed on Oct. 28, 2022, now Pat. No. 12,063,507, which is a (Continued)

(51) Int. Cl.
*H04W 12/08*     (2021.01)
*H04L 9/08*     (2006.01)
(Continued)

(52) U.S. Cl.
CPC ........... *H04W 12/08* (2013.01); *H04L 9/0866* (2013.01); *H04L 9/0894* (2013.01);
(Continued)

(58) Field of Classification Search
None
See application file for complete search history.

(56) References Cited

U.S. PATENT DOCUMENTS 9,049,698 B2   6/2015   Johansson et al.
9,867,226 B2   1/2018   Kubota et al.
(Continued)

FOREIGN PATENT DOCUMENTS

CA     3038129     5/2018
CN     101835156 A     9/2010
(Continued)

OTHER PUBLICATIONS

Extended Hearing Notice for Indian Application No. 201947045113 dated Mar. 4, 2025, 2 pages.

(Continued)

*Primary Examiner* — Benjamin E Lanier
(74) *Attorney, Agent, or Firm* — Alston & Bird LLP

(57) ABSTRACT

Following radio link failure (RLF) of a radio link between a cellular internet-of-things (CIoT) user equipment (UE) and a source access node (nodeB) during a data transfer operation over a control plane between a mobility management entity (MME) of a narrow-band IoT (NB-IoT), a radio link is recovered by transmitting an RLF message from the CIoT UE to the MME of the NB-IoT network via a target nodeB, the target nodeB being different from the source nodeB. The RLF message is protected using a key associated with a non-access stratum (NAS) security context previously established between the CIoT UE and the MME of the NB-IoT network. The MME of the NB-IoT network can retrieve data that failed to be delivered to the CIoT UE due to the RLF during the data transfer operation over the control plane and provide said data to the UE via target nodeB.

20 Claims, 6 Drawing Sheets

Related U.S. Application Data continuation of application No. 16/953,933, filed on Nov. 20, 2020, now Pat. No. 11,523,280, which is a continuation of application No. 15/700,940, filed on Sep. 11, 2017, now Pat. No. 10,917,789.

(60) Provisional application No. 62/488,179, filed on Apr. 21, 2017.

(51) Int. Cl.

| | |
|---|---|
| *H04L 9/32* | (2006.01) |
| *H04L 9/40* | (2022.01) |
| H04L 41/0654 | (2022.01) |
| H04W 8/02 | (2009.01) |
| H04W 76/19 | (2018.01) |

(52) U.S. Cl.
CPC ........ *H04L 9/3226* (2013.01); *H04L 63/0428* (2013.01); *H04L 41/0654* (2013.01); *H04L 2209/80* (2013.01); *H04W 8/02* (2013.01); *H04W 76/19* (2018.02)

(56) References Cited

U.S. PATENT DOCUMENTS

| | | | |
|---|---|---|---|
| 9,918,262 B2 | 3/2018 | Xu et al. | |
| 10,034,208 B2 | 7/2018 | Moon et al. | |
| 10,462,837 B2 | 10/2019 | Escott et al. | |
| 10,623,990 B2 | 4/2020 | Chun et al. | |
| 10,694,383 B2 | 6/2020 | Cho et al. | |
| 10,917,789 B2 | 2/2021 | Nair | |
| 11,523,280 B2 | 12/2022 | Nair | |
| 12,063,507 B2 * | 8/2024 | Nair ...................... | H04W 12/08 |
| 2008/0102843 A1 | 5/2008 | Todd et al. | |
| 2008/0242292 A1 | 10/2008 | Koskela et al. | |
| 2010/0166184 A1 | 7/2010 | Wu | |
| 2011/0092236 A1 | 4/2011 | Iwamura et al. | |
| 2011/0110227 A1 | 5/2011 | Yang et al. | |
| 2011/0159841 A1 | 6/2011 | Escott et al. | |
| 2012/0197801 A1 | 8/2012 | Jimenez | |
| 2013/0035056 A1 | 2/2013 | Prasad et al. | |
| 2014/0064065 A1 | 3/2014 | Rogers et al. | |
| 2015/0223106 A1 | 8/2015 | Van Phan et al. | |
| 2015/0269028 A1 | 9/2015 | Horn et al. | |
| 2016/0050604 A1 | 2/2016 | Lee et al. | |
| 2016/0366571 A1 | 12/2016 | Payne et al. | |
| 2017/0099621 A1 | 4/2017 | Michaelsen et al. | |
| 2017/0099682 A1 | 4/2017 | Priyanto et al. | |
| 2017/0332440 A1 | 11/2017 | Xu et al. | |
| 2018/0132293 A1 | 5/2018 | Escott et al. | |
| 2018/0270891 A1 | 9/2018 | Kim et al. | |
| 2018/0309575 A1 | 10/2018 | Nair | |
| 2019/0021023 A1 | 1/2019 | Byun et al. | |
| 2019/0045349 A1 | 2/2019 | Kim et al. | |

FOREIGN PATENT DOCUMENTS

| | | | |
|---|---|---|---|
| CN | 102075938 A | 5/2011 | |
| CN | 105191479 A | 12/2015 | |
| CO | 6781508 A2 | 10/2013 | |
| EP | 2645804 A1 | 10/2013 | |
| GB | 455827 | 10/1936 | |
| GB | 2455707 A | 6/2009 | |
| JP | 2021-106406 A | 7/2021 | |
| RU | 2461990 C2 | 9/2012 | |
| RU | 2492596 C2 | 9/2013 | |
| WO | WO 2009/075341 A1 | 6/2009 | |
| WO | WO 2013/166679 A1 | 11/2013 | |
| WO | WO 2016/140403 A1 | 9/2016 | |
| WO | WO 2016/164808 A1 | 10/2016 | |
| WO | WO 2018/194809 A1 | 10/2018 | |

OTHER PUBLICATIONS

Notice of Grant for Colombian Application No. NC2019/0012011 dated Feb. 25, 2025, 18 pages.

Office Action for Indonesian Application No. P00201909835 dated Feb. 14, 2025, 4 pages.

Office Action for Philippine Application No. 1/2019/502372 dated Jul. 28, 2025, 4 pages.

Notice of Allowance for Vietnamese Application No. 1-2019-06524 dated Sep. 24, 2025, 2 pages.

Office Action for Canadian Application No. 3,060,420 dated Oct. 21, 2025, 3 pages.

"3rd Generation Partnership Project; Technical Specification Group Core Network and Terminals; Non-Access-Stratum (NAS) protocol for Evolved Packet System (EPS); Stage 3 (Release 14)", 3GPP TS 24.301 v14.4.0, (Jun. 2017), 486 pages.

"3rd Generation Partnership Project; Technical Specification Group Services and System Aspects; 3GPP System Architecture Evolution (SAE); Security architecture (Release 14)", 3GPP TS 33.401 v14.4.0, (Sep. 2017), 153 pages.

"3rd Generation Partnership Project; Technical Specification Group Services and System Aspects; 3GPP System Architecture Evolution (SAE); Security architecture (Release 16)", 3GPP TS 33.401 v16.3.0, (Jul. 2020), 170 pages.

"LTE; Evolved Universal Terrestrial Radio Access (E-UTRA) and Evolved Universal Terrestrial Radio Access Network (E-UTRAN); Overall Description; Stage 2", 3GPP TS 36.300 v14.2.0, (Apr. 2017), 346 pages.

"Reply LS on Mobility Enhancements for eNB-IoT", 3GPP TSG-RAN WG3 Meeting #95, R3-170881, (Feb. 13-17, 2017), 1 page.

3GPP RAN2, "Security Aspects of RRC Connection Re-Establishment for NB-IoT (DoNAS)", 3GPP TSG SA WG3 (Security) Meeting #85, S3-161934, (Nov. 7-11, 2016), 1 page.

3GPP, "3rd Generation Partnership Project; Technical Specification Group Core Network and Terminals; Evolved Packet System (EPS); Mobility Management Entity (MME) and Serving GPRS Support Node (SGSN) Related Interfaces Based on Diameter Protocol (Release 14), " 3GPP TS 29.272, V14.0.0, Jun. 2016, 153 pages.

3GPP, "3rd Generation Partnership Project; Technical Specification Group Core Network and Terminals; Non-Access Stratum (NAS) Protocol for Evolved Packet System (EPS); Stage 3 (Release 14), " 3GPP TS 24.301, V14.2.0, Dec. 2016, 470 pages.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 14)," 3GPP TS 36.300, V14.1.0, Dec. 2016, 317 pages.

3GPP, "3rd Generation Partnership Project; Technical Specification Group Radio Access Network; Evolved Universal Terrestrial Radio Access Network (E-UTRAN); S1 Application Protocol (S1AP) (Release 14)," 3GPP TS 36.413, V14.1.0, Jan. 2017, 333 pages.

3GPP, 3rd Generation Partnership Project; Technical Specification Group Services and System Aspects; 3GPP System Architecture Evolution (SAE); Security Architecture (Release 14), 3GPP TS 33.401, V14.1.0, Dec. 2016, 152 pages.

3GPP, "3rd Generation Partnership Project; Technical Specification Group Services and System Aspects; General Packet Radio Service (GPRS) Enhancements for Evolved Universal Terrestrial Radio Access Network (E-UTRAN) Access (Release 14)," 3GPP TS 23.401, V14.2.0, Dec. 2016, 385 pages.

3GPP, "3rd Generation Partnership Project; Technical Specification Group Services and System Aspects; Procedures for the 5G System; Stage 2 (Release 15)," 3GPP TS 23.502, V0.1.0, Jan. 2017, 44 pages.

3GPP, "3rd Generation Partnership Project; Technical Specification Group Services and System Aspects; Study on the Security Aspects of the Next Generation System (Release 14), " 3GPP TR 33.899, V1.1.0, Mar. 2017, 491 pages.

3GPP, "3rd Generation Partnership Project; Technical Specification Group Services and System Aspects; System Architecture for the 5G System; Stage 2 (Release 15)," 3GPP TS 23.501, V0.4.0, Apr. 2017, 124 pages.

(56) References Cited

OTHER PUBLICATIONS

3GPP, "A Solution for RLF in CP NB-IoT"; Ericsson; NB-IOT / Rel 14; 3GPP TSG-SA WG3 Meeting #86, dated Feb. 6-10, 2017, 5 pages.
3GPP, "Connected Mode Mobility For NB-IOT UE Using CP CIoT EPS Optimisation"; Intel Corporation, Agenda Item 3.11.3; TSG-RAN WG2 #95bis; R2-166683; dated Oct. 10-14, 2016, 6 pages.
3GPP, "Protecting the RLF Procedure for NB-IoT UEs using the NAS Security Context"; Qualcomm Incorporated; 3GPP TSG SA WG3 (Security) Meeting #86, dated Feb. 6-10, 2017, 3 pages.
3GPP, "Reply LS on Security Aspects of RRC Connection Re-Establishment for NB-IoT (DoNAS)"; Rel-14; NB_IOTenh; 3GPP TSG SA WG3 (Security) Meeting #85, dated Nov. 7-11, 2017, 2 pages.
3GPP, "RLF Situation for Control Plane CIoT EPS Optimizations Solution"; HW; S3-170332; 3GPP TSG SA WG3 (Security) Meeting #86, dated Feb. 6-10, 2017, 4 pages.
3GPP, "Security for the RLFs for UEs Doing User Plane Over Control Plane Using NAS Level Security," Qualcomm Incorporated; S3-171997, TEI14 (Release 14), 3GPP TSG-SA WG3 Meeting #88, Aug. 2017, 2 pages.
3GPP, "Security for the RLFs for UEs Doing User Plane Over Control Plane Using NAS Level Security," Qualcomm Incorporated; S3-172137, TEI14 (Release 14), 3GPP TSG-SA WG3 Meeting #88, Aug. 2017, 2 pages.
3GPP, "Security of RRC Connection Re-establishment of NB-IOT for CP Solution"; Intel Corporation, NB-IOT/Rel-14; 3GPP TSG SA WG3 (Security) Meeting #86, dated Feb. 6-10, 2017, 6 pages.
3GPP, "Security Solution to Support CIoT Optimization for Large File Transfer"; Nokia; NB-IOT/Rel-14; 3GPP TSG SA WG3 (Security) Meeting #86, dated Feb. 6-10, 2017, 6 pages.
Decision to Grant a Patent for an Invention for Russian Patent Application No. 2019134998/07, dated Dec. 11, 2020, with English translation, 24 pages.
Decision to Grant for Japanese Application No. 2021-059583 dated Jun. 1, 2022, 6 pages.
Decision to Grant for Japanese Application No. 2021-209119 dated Jun. 3, 2024, 4 pages.
Ericsson et al., "Updated solution for RLF in CP CIoT EPS optimizations", 3GPP TSG-SA WG3 Meeting #xx, S3A0007, (May 2, 2017), 4 pages.
Ericsson, "A Solution for RLF in CP NB-IoT", 3GPP TSG-SA WG3 Meeting #86, S3-170254, (Feb. 6-10, 2017), 5 pages.
Ericsson, "Response to R3-162761-R3-162764", 3GPP TSG-RAN WG3 Meeting #94, R3-163075, (Nov. 14-18, 2016), 2 pages.
Examination Report No. 1 for Standard Patent Application for Australian Patent Application No. 2018254323 dated Dec. 23, 2020, 5 pages.
Form 21 Decision to Grant for Kenya Application No. AP/P/2019/011935 dated May 10, 2021, 5 pages.
Huawei (Rapporteur), "Offline discussion on CP mobility", 3GPP TSG-RAN Meeting #95, R3-170425, (Feb. 13-17, 2017), 3 pages.
Huawei et al., "NAS Security Solution for DoNAS RLF", 3GPP TSG SA WG3 (Security) eMeeting on DoNAS (NB-IoT), S3A0008, (May 2, 2017), 3 pages.
Huawei et al., "RRC impact of RRC connection Re-establishment based on NAS solution A", 3GPP TSG-RAN WG2 Meeting #98, R2-1705394, (Feb. 15-29, 2017), 5 pages.
Huawei, "Details on NAS Message Handling During X2 Handover", 3GPP TSG RAN WG3 Meeting #57bis, R3-071944, (Oct. 8-11, 2007), 8 pages.
Intel Corporation, "Security of RRC Connection re-establishment of NB-IOT for CP Solution", 3GPP TSG SA WG3 (Security) Meeting #86, S3-170162, (Feb. 6-10, 2017), 6 pages.
International Search Report and Written Opinion for Application No. PCT/US2018/025008 dated Jul. 3, 2018, 9 pages.
MediaTek Inc., "Feasibility of Lossless Mobility for the CP Solution", 3GPP TSG-RAN3 #96 Meeting, R3-163067, (Nov. 14-18, 2016), 3 pages.

Nokia, "Solution for RLF in CP NB-IoT using NAS context and NAS keys", 3GPP TSG-SA WG3 Meeting #xx, S3A0003, (May 2, 2017), 3 pages.
Non-Final Office Action for U.S. Appl. No. 16/953,933 dated Jan. 14, 2022.
Non-Final Office Action for U.S. Appl. No. 17/976,047 dated Dec. 18, 2023.
Notice of Acceptance for Australian Application No. 2018254323 dated Jun. 23, 2021, 3 pages.
Notice of Acceptance for Nigeria Application No. NG/PT/C/2019/4097 dated Nov. 2020, 2 pages.
Notice of Acceptance for South Africa Application No. 2019/07516 dated Apr. 14, 2021, 1 page.
Notice of Allowance for Chinese Application No. 201880037225.0 dated Jun. 12, 2023, 4 pages.
Notice of Allowance for Korean Application No. 10-2019-7034413 dated Apr. 12, 2021, 3 pages.
Notice of Allowance for Singapore Application No. 11201909741U dated Jun. 9, 2023, 6 pages.
Notice of Allowance for U.S. Appl. No. 15/700,940 dated Jul. 6, 2020.
Notice of Allowance for U.S. Appl. No. 15/700,940 dated Oct. 22, 2020.
Notice of Allowance for U.S. Appl. No. 16/953,933 dated Jul. 29, 2022.
Notice of Allowance for U.S. Appl. No. 16/953,933 dated May 20, 2022.
Notice of Allowance for U.S. Appl. No. 17/976,047 dated Apr. 10, 2024.
NTT Docomo, "GBR Bearer Termination at Radio Link Failure", 3GPP TSG SA WG2 Meeting #75, S2-095242, (Aug. 31-Sep. 4, 2009), 3 pages.
Office Action for Canadian Application No. 3,060,420 dated Feb. 3, 2023, 4 pages.
Office Action for Canadian Application No. 3,060,420 dated Jul. 5, 2022, 4 pages.
Office Action for Canadian Application No. 3,060,420 dated Nov. 21, 2023, 4 pages.
Office Action for Canadian Application No. 3060420 dated Aug. 26, 2021, 3 pages.
Office Action for Canadian Patent Application No. 3,060,420 dated Dec. 3, 2020, 4 pages.
Office Action for Chinese Application No. 201880037225.0 dated Mar. 18, 2023, 9 pages.
Office Action for Chinese Application No. 201880037225.0 dated Sep. 19, 2022, 11 pages.
Office Action for Colombian Application No. NC2019/0012011 dated Apr. 17, 2024, 12 pages.
Office Action for Colombian Application No. NC2019/0012011 dated May 9, 2022, 15 pages.
Office Action for European Application No. 18720686.7 dated Jan. 15, 2024, 7 pages.
Office Action for European Application No. 18720686.7 dated Mar. 1, 2023, 7 pages.
Office Action for European Application No. 18720686.7 dated Mar. 11, 2021, 7 pages.
Office Action for Japanese Application No. 2019-556832 dated Aug. 23, 2021, 8 pages.
Office Action for Japanese Application No. 2019-556832 dated Aug. 3, 2022, 7 pages.
Office Action for Japanese Application No. 2021-209119 dated Apr. 3, 2023, 11 pages.
Office Action for Japanese Application No. 2021-209119 dated Nov. 1, 2023, 3 pages.
Office Action for Japanese Application No. 2022-107180 dated May 30, 2024, 12 pages.
Office Action for Japanese Application No. 2022-107180 dated Sep. 14, 2023, 13 pages.
Office Action for Japanese Patent Application No. 2019-556832, dated Nov. 9, 2020, with English translation, 5 pages.
Office Action for Kenya Application No. AP/P/2019/011935 dated Oct. 30, 2020, 4 pages.

(56) References Cited

OTHER PUBLICATIONS

Office Action for Korean Application No. 10-2019-7034413 dated Nov. 9, 2020, 7 pages.
Office Action for Malaysian Application No. PI2019006176 dated Apr. 2, 2024, 3 pages.
Office Action for Mexican Application No. MX/a/2019/012533 dated Sep. 12, 2023, 10 pages.
Office Action for Mexico Application No. MX/a/2019/012533 dated Dec. 6, 2022, 10 pages.
Office Action for Mexico Application No. MX/a/2019/012533 dated Mar. 28, 2023, 8 pages.
Office Action for Russian Application No. 2019134998/07 dated May 14, 2020, 8 pages.
Office Action for Russian Application No. 2019134998/07 dated Sep. 3, 2020.
Office Action for Singapore Application No. 11201909741U dated Mar. 7, 2022, 7 pages.
Office Action for U.S. Appl. No. 15/700,940 dated Apr. 16, 2020.
Office Action for U.S. Appl. No. 15/700,940 dated Jan. 7, 2020.
Office Action for U.S. Appl. No. 15/700,940 dated Jun. 3, 2019.
Office Action for U.S. Appl. No. 15/700,940 dated Sep. 12, 2019.
Qualcomm Incorporated, "Introduction of RRC connection re-establishment for NB-IoT control plane", 3GPP TSG-RAN WG2 Meeting #98, 36.331 Change Request 2823, R2-1704707, (May 15-19, 2017), 7 pages.
Qualcomm Incorporated, "On Mobility in CP-CIoT", 3GPP TSG-RAN WG3 Meeting #95, R3-170655, (Feb. 13-17, 2017), 4 pages.
Qualcomm Incorporated, "Protecting the RLF Procedure for NB-IoT Ues Using the NAS Security Context", 3GPP TSG SA WG3 (Security) Meeting #86, S3-170302, (Feb. 6-10, 2017), 4 pages.
Qualcomm Incorporated, "RRC Re-Establishment for CP", 3GPP TSG RAN WG2 #98, R2-1704709, (May 15-19, 2017), 4 pages.
RAN2, "Reply LS on security for RLF for DoNAS UEs", 3GPP TSG RAN WG2 #98, R2-1705939, (May 15-19, 2017), 1 page.
SA WG3, "Reply LS on Security aspects of RRC Connection Re-Establishment for NB-IoT (DoNAS)", 3GPP TSG SA WG3 (Security) Meeting #85, S3- 162088, (Nov. 7-11, 2016), 2 pages.
SA3, "LS to RAN2 and RAN3 on security for RLFs for DoNAS UEs", 3GPP TSG SA WG3 (Security) eMeeting on DoNAS (NB-IoT), Tdoc S3A0009, (May 2, 2017), 1 page.
Search Report and Written Opinion for Singapore Patent Application No. 11201909741U dated Jan. 12, 2021, 8 pages.
Supplemental Notice of Allowability for U.S. Appl. No. 15/700,940, filed Sep. 11, 2017.
Trial and Appeal Decision for Japanese Application No. 2019-556832 dated Feb. 20, 2023, 4 pages.
ZTE, "Discussion on Security Method of Mobility Enhancement for NBIoT CP Solution", 3GPP TSG SA WG3 (Security) Meeting #86, S3-170077, (Feb. 6-10, 2017), 5 pages.
ZTE, "The CP solution for NB IoT mobility enhancement", 3GPP TSG RAN WG3 Meeting #95, R3-170600, (Feb. 13-17, 2017), 3 pages.
Decision to Grant for Japanese Application No. 2022-107180 dated Jan. 27, 2025, 4 pages.
Hearing Notice for Indian Application No. 201947045113 dated Dec. 4, 2024, 3 pages.
Notice of Allowance for Mexican Application No. MX/a/2019/012533 dated Mar. 22, 2024, 6 pages.
Office Action for Malaysian Application No. PI2019006176 dated Nov. 5, 2024, 1 page.
Office Action for Philippine Application No. Jan. 2019/502372 dated Jun. 20, 2024, 5 pages.
Notice of Allowance for Philippine Application No. 1/2019/502372 dated Feb. 26, 2026, 2 pages.
Notice of Reasons for Refusal for Japanese Application No. 2025-028855 dated Feb. 19, 2026, 13 pages.

* cited by examiner

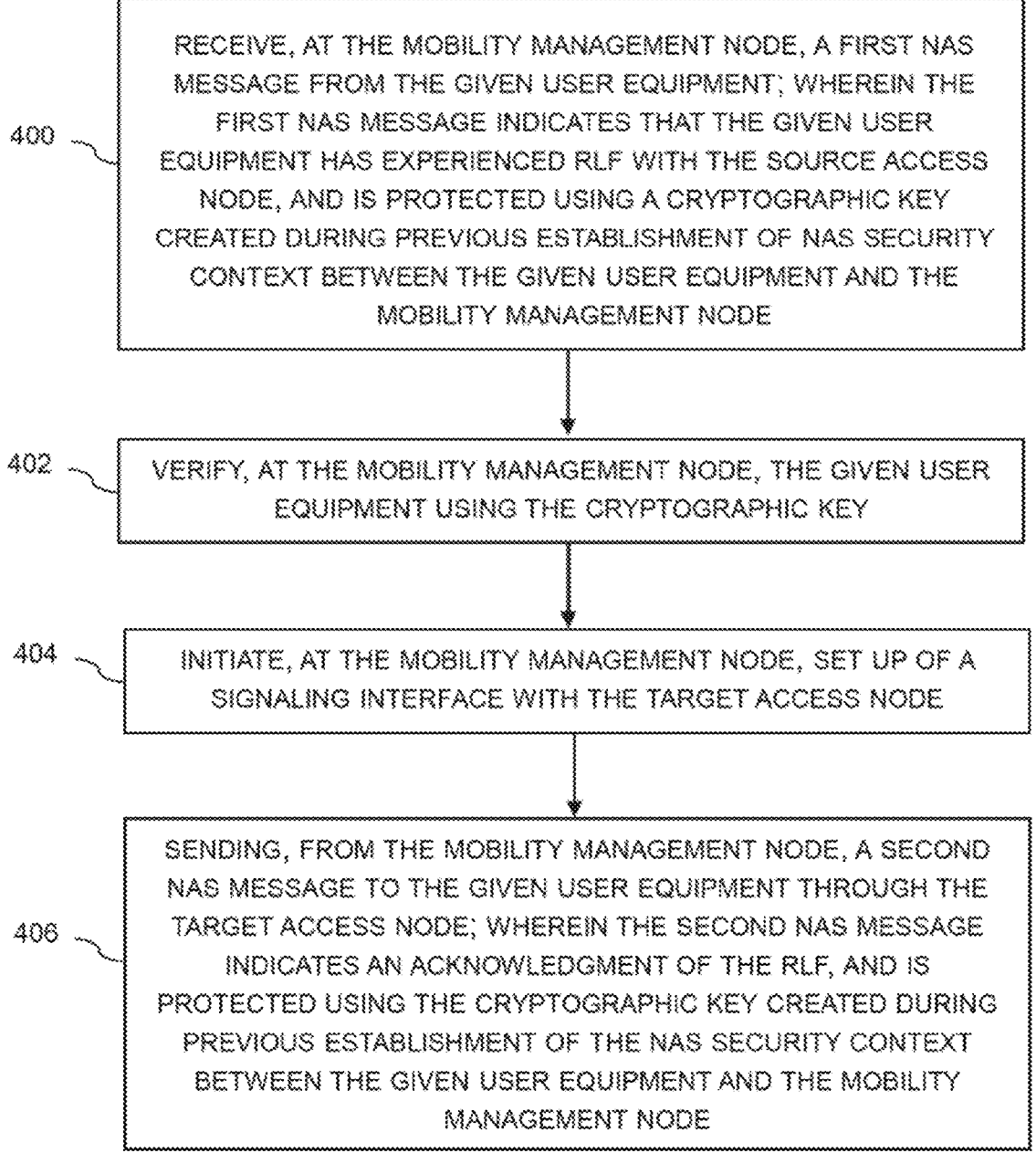

400 — RECEIVE, AT THE MOBILITY MANAGEMENT NODE, A FIRST NAS MESSAGE FROM THE GIVEN USER EQUIPMENT; WHEREIN THE FIRST NAS MESSAGE INDICATES THAT THE GIVEN USER EQUIPMENT HAS EXPERIENCED RLF WITH THE SOURCE ACCESS NODE, AND IS PROTECTED USING A CRYPTOGRAPHIC KEY CREATED DURING PREVIOUS ESTABLISHMENT OF NAS SECURITY CONTEXT BETWEEN THE GIVEN USER EQUIPMENT AND THE MOBILITY MANAGEMENT NODE

402 — VERIFY, AT THE MOBILITY MANAGEMENT NODE, THE GIVEN USER EQUIPMENT USING THE CRYPTOGRAPHIC KEY

404 — INITIATE, AT THE MOBILITY MANAGEMENT NODE, SET UP OF A SIGNALING INTERFACE WITH THE TARGET ACCESS NODE

406 — SENDING, FROM THE MOBILITY MANAGEMENT NODE, A SECOND NAS MESSAGE TO THE GIVEN USER EQUIPMENT THROUGH THE TARGET ACCESS NODE; WHEREIN THE SECOND NAS MESSAGE INDICATES AN ACKNOWLEDGMENT OF THE RLF, AND IS PROTECTED USING THE CRYPTOGRAPHIC KEY CREATED DURING PREVIOUS ESTABLISHMENT OF THE NAS SECURITY CONTEXT BETWEEN THE GIVEN USER EQUIPMENT AND THE MOBILITY MANAGEMENT NODE

FIG. 4

RADIO LINK RECOVERY FOR USER EQUIPMENT

CROSS-REFERENCE TO RELATED APPLICATIONS

The present application is a continuation of U.S. Non-Provisional patent application Ser. No. 17/976,047, filed Oct. 28, 2022 and entitled "Radio Link Recovery for User Equipment," which is a continuation of U.S. Non-Provisional patent application Ser. No. 16/953,933, filed Nov. 20, 2020 and entitled "Radio Link Recovery for User Equipment," which is a continuation of U.S. Non-Provisional patent application Ser. No. 15/700,940, filed Sep. 11, 2017 and entitled "Radio Link Recovery for User Equipment," which claims the benefit of priority to U.S. Provisional Application Ser. No. 62/488,179, filed Apr. 21, 2017 and entitled "Cellular Internet of Things (CIT) UE Radio Link Recovery Using NAS Keys," the entire disclosures of each of which are hereby incorporated herein by reference in their entireties for all purposes.

FIELD

The field relates generally to communication systems, and more particularly, but not exclusively, to security within such systems.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

In an LTE example communication system, user equipment (UE) such as a mobile device communicates over an air interface with a base station referred to as an evolved Node B (eNB). The eNB is illustratively part of an access network of the system such as, for example, an Evolved Universal Terrestrial Radio Access Network (E-UTRAN). The eNB provides access for the UE to a Core Network (CN), which then provides access for the UE to a data network such as a packet data network (e.g., PDN such as the Internet).

Narrow-Band IoT (NB-IoT) is a low power wide area network (LPWAN) radio technology developed to enable connection of a wide range of devices (e.g., mobile devices, sensors, smart meters, etc.) and services using a cellular communication network. For example, in the above-mentioned LTE network, the E-UTRAN connects cellular IoT (CIoT) UEs to a CN and ultimately to services available through a PDN or other data network. However, in currently proposed implementations, there are security concerns for CIoT UEs in NB-IoT networks, for example, during operations such as radio link recovery.

SUMMARY

Illustrative embodiments provide techniques for providing secure radio link recovery for user equipment in a communication system.

Described herein are systems, apparatuses, methods, and computer program products for recovering a radio link after radio link failure. Following radio link failure (RLF) of a radio link between a cellular internet-of-things (CIoT) user equipment (UE) and a source access node (nodeB) during a data transfer operation over a control plane between a mobility management entity (MME) of a narrow-band IoT (NB-IoT), a radio link is recovered by transmitting an RLF message from the CIoT UE to the MME of the NB-IoT network via a target nodeB, the target nodeB being different from the source nodeB. The RLF message is protected using a key associated with a non-access stratum (NAS) security context previously established between the CIoT UE and the MME of the NB-IoT network. The MME of the NB-IoT network can retrieve data that failed to be delivered to the CIoT UE due to the RLF during the data transfer operation over the control plane and provide said data to the UE via target nodeB.

In one embodiment, a method comprises, in response to a radio link failure between given user equipment and a source access node of a communication system during a data transfer operation over a control plane, recovering the radio link for the given user equipment through a target access node of the communication system. The radio link recovery is enabled via a mobility management node of the communication system using a non-access stratum security context previously established between the given user equipment and the mobility management node.

In another embodiment, a method comprises, in response to a radio link failure between given user equipment and a source access node of a communication system during a data transfer operation over a control plane, recovering the radio link for the given user equipment through a target access node of the communication system. The radio link recovery is initiated by the given user equipment by sending a message to a mobility management node of the communication system through the target access node using a non-access stratum security context previously established between the given user equipment and the mobility management node.

Advantageously, in illustrative embodiments, secure radio link recovery is achieved with no new context set up to protect the link between the given user equipment and the target access node, only the non-access stratum security context between the given user equipment and the mobility management node and its related cryptographic keys are used. For the sake of key separation, new keys may be computed using existing non-access stratum security parameters or non-access stratum message counts either in the uplink or in the downlink.

Further embodiments are provided in the form of non-transitory computer-readable storage medium having embodied therein executable program code that when executed by a processor causes the processor to perform the above steps. Still further embodiments comprise apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 4 shows a flow diagram of a radio link recovery process, in accordance with some of the embodiments described herein.

DETAILED DESCRIPTION

Figure 1A:
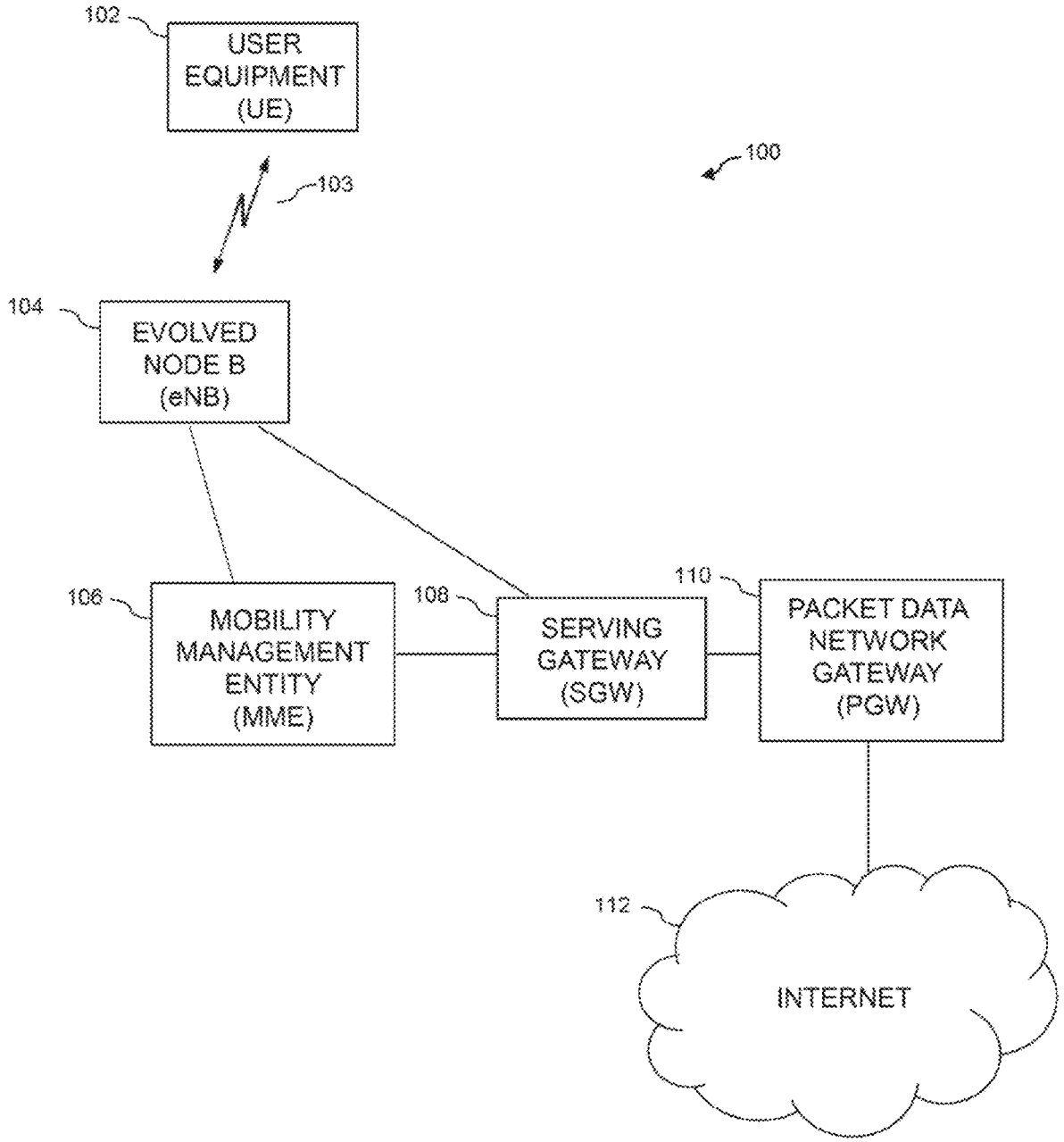
FIGS. 1A and 1B show a communication system in which radio link recovery is implemented, in accordance with some of the embodiments described herein.

Embodiments will be illustrated herein in conjunction with example communication systems and associated techniques for radio link recovery for user equipment. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as an LTE Evolved Packet Core (EPC), the disclosed embodiments can be adapted in a straightforward manner to a variety of other types of communication systems including, but not limited to, WiMAX systems and Wi-Fi systems. Also, while illustrative embodiments are particularly well suited for implementation in NB-IoT networks, embodiments may be implemented in other networks wherein secure radio link recovery would be desired or needed.

Various illustrative embodiments are now described with reference to the drawings, wherein like reference numbers are used to refer to like elements throughout. In the following description, for purposes of explanation, numerous specific details are set forth in order to provide a thorough understanding of one or more illustrative embodiments. It may be evident, however, that such illustrative embodiment(s) may be practiced without these specific details, or with functionally similar or equivalent substitutions.

As illustratively used herein, Non-Access Stratum (NAS) is a functional layer of a communication network that provides non-radio signaling for certain control plane functionalities between the UE and the Core Network (CN), transparent to the Radio Access Network (RAN). Such functionalities include, but are not limited to, mobility management, authentication, etc. Compare the NAS functional layer to the Access Stratum (AS), which is the functional layer below NAS that provides functionalities between the UE and the RAN including, but not limited to, data transport over a wireless connection and radio resource management.

Support of radio link recovery and mobility for NB-IoT UEs using a CIoT optimization solution is under consideration by relevant standards bodies. This optimization solution for data transfer over an NAS layer is also referred to as Data Over NAS (DoNAS). Some proposals include the use a Radio Resource Control (RRC) connection re-establishment procedure to allow context fetch and data forwarding from a serving (or source) eNB to a target eNB in a mobility scenario, similar to the active mode hand-over scenario of conventional practice. However, such proposals may pose a security risk that should be addressed to reduce potential harm from malicious actors.

More particularly, the UE's use of a Radio Resource Control (RRC) connection re-establishment procedure for a CIoT control plane optimization (DoNAS) may be vulnerable to attack, since the RRC connection of the CIoT UE to the eNB is not security protected. Various aspects of the following discussion may be illuminated by reference to TS23.401, Rel. 14, 2016-12, § 5.3.4B.2, TS 24.301, TS 33.401, each of which are incorporated by reference in their entireties.

At least one current proposal for CIoT control plane optimization strategy includes a single short data packet strategy. However, it is realized herein that such a strategy may be compromised in terms of security. A threat analysis demonstrates that unless the UE-eNB link is protected, it is vulnerable to attacks. The following observations result from such a threat analysis:

If the UE has a large amount of data to send or receive, the UE may have an access stratum (AS) context established with an eNB and a NAS context established with a Mobility Management Entity (MME). In such cases, the RRC messages should be protected. Without such context and protection, maintaining sustained connection of the UE with the eNB may not be possible, e.g., the UE connection can be hijacked or closed by an attacker UE. The eNB may also be subject to attacks with spurious data and/or control packets in the uplink (UL).

In some current proposals, it is not clear how mobility (e.g., handover of the UE from a serving or source eNB to a target eNB) is achieved without establishing an AS context in a reliable manner. Thus, for reliable X2 or S1 handover, an AS context needs to be established.

Without an AS security context in a serving or source eNB and target eNB, attack scenarios exist on the downlink (DL) and UL for a DoNAS UE and to its S1 Application Protocol (S1AP) link.

In various illustrative embodiments, one or more of the aforementioned security risks may be mitigated by enabling security for radio link recovery by protecting the link between the UE and the eNB utilizing the NAS context between the UE and an MME element (node) of the CN, and NAS keys associated with that context.

Before describing such secure radio link recovery processes according to illustrative embodiments, an illustrative communication system in which such processes may be implemented is described in connection with FIGS. 1A and 1B.

FIG. 1A shows a communication system 100 comprising user equipment (UE) 102 that communicates via an air interface 103 with an evolved Node B (eNB) 104. In this illustrative embodiment, the communication system 100 comprises a wireless cellular system, and more particularly, an LTE system. The communication system 100 illustrates at least part of an NB-IoT network.

The user equipment 102 may be a mobile station, and such a mobile station may comprise, by way of example, a mobile telephone, a computer, a sensor, a smart meter, or any other type of communication device. The term "user equipment" as used herein is therefore intended to be construed broadly, so as to encompass a variety of different types of mobile stations, subscriber stations or, more generally, communication devices, including examples such as a combination of a data card inserted in a communication device. Such communication devices are also intended to encompass devices commonly referred to as access terminals. In this illustrative embodiment, UE 102 is considered a CIoT UE.

The eNB 104 is illustratively part of an access network of the communication system 100. Such a radio access network may comprise, for example, an E-UTRAN having a plurality of base stations and one or more associated radio network controllers (RNCs). The base stations and RNCs are logically separate entities, but in a given embodiment may be implemented in the same physical network element, such as, for example, a base station router or femto cellular access point. The eNB may, more generally, be referred to as an access node. While FIG. 1A illustrates 4G network nomenclature, it is to be understood that the communication system 100 may be a 5G network or a hybrid 4G/5G network. Thus, the access point referred to as an eNB in the 4G network, is referred to as a gNB in a 5G network. The access node (e.g., gNB/eNB) is illustratively part of a radio access network of the communication system. While the 4G network utilizes an E-UTRAN as the radio access network, in a 5G network, the access network is referred to as a 5G System and is described in 5G Technical Specification (TS) 23.501, V0.4.0, entitled "Technical Specification Group Services and System Aspects; System Architecture for the 5G System," the disclosure of which is incorporated by reference herein in its entirety. In general, the access node (e.g., gNB/eNB) provides access for the UE to a CN, which then provides access for the UE to other UEs and/or a data network such as a packet data network (e.g., Internet). In this illustrative embodiment, a CIoT UE may access CIoT services via the data packet network.

The eNB 104 in this illustrative embodiment is operatively coupled to a Mobility Management Entity (MME) 106. MME 106 is one example of what is referred to as a "mobility management entity element," "mobility management entity function" or, more generally, a "mobility management node." A mobility management node, as used herein, is the element or function in the communication system that enables, among other network operations, radio link recovery operations with the UE (through an eNB). The CNB 104 is also operatively coupled to a Serving Gateway (SGW) 108, which is operatively coupled to a Packet Data Network (PDN) Gateway (PGW) 110. PGW 110 is operatively coupled to a Packet Data Network, e.g., Internet 112. MME 106 is also operatively coupled to SGW 108. MME 106 and SGW 108 are considered part of the CN. In some embodiments, PGW 110 is also considered part of the CN.

It is to be appreciated that this particular arrangement of system elements is an example only, and other types and arrangements of additional or alternative elements can be used to implement a communication system in other embodiments. For example, in other embodiments, the system 100 may comprise authentication elements, as well as other elements not expressly shown herein.

Accordingly, the FIG. 1A arrangement is just one example configuration of a wireless cellular system, and numerous alternative configurations of system elements may be used. For example, although only single UE, eNB, MME, SGW and PGW elements are shown in the FIG. 1A embodiment, this is for simplicity and clarity of description only. A given alternative embodiment may of course include larger numbers of such system elements, functions and/or nodes, as well as additional or alternative elements, functions and/or nodes of a type commonly associated with conventional system implementations.

It is also to be noted that while FIG. 1A illustrates system elements, functions and/or nodes as singular functional blocks, the various subnetworks that make up a 5G network are partitioned into so-called network slices. Network slices (network partitions) comprise a series of function sets (i.e., function chains) for each corresponding service type using network function virtualization (NFV) on a common physical infrastructure. The network slices are instantiated as needed for a given service, e.g., enhanced mobile broadband (eMBB) service, massive IoT service, and mission critical IoT service. A network slice or function set is thus instantiated when an instance of that network slice or function set is created. In some embodiments, this involves installing or otherwise running the network slice or function set on one or more host devices of the underlying physical infrastructure. UE 102 accesses one or more of these services through the CN via eNB 104.

As mentioned above, a radio link failure may occur whereby the UE 102 loses connection with eNB 104 for a variety of typical reasons. In such a case, as depicted in FIG. 1B, when UE 102 loses connection with eNB 104 (depicted as Source eNB), it may re-establish connection (air interface 103) with eNB 114 (depicted as Target eNB) in accordance with radio link recovery processes according to illustrative embodiments.

Figure 1B:
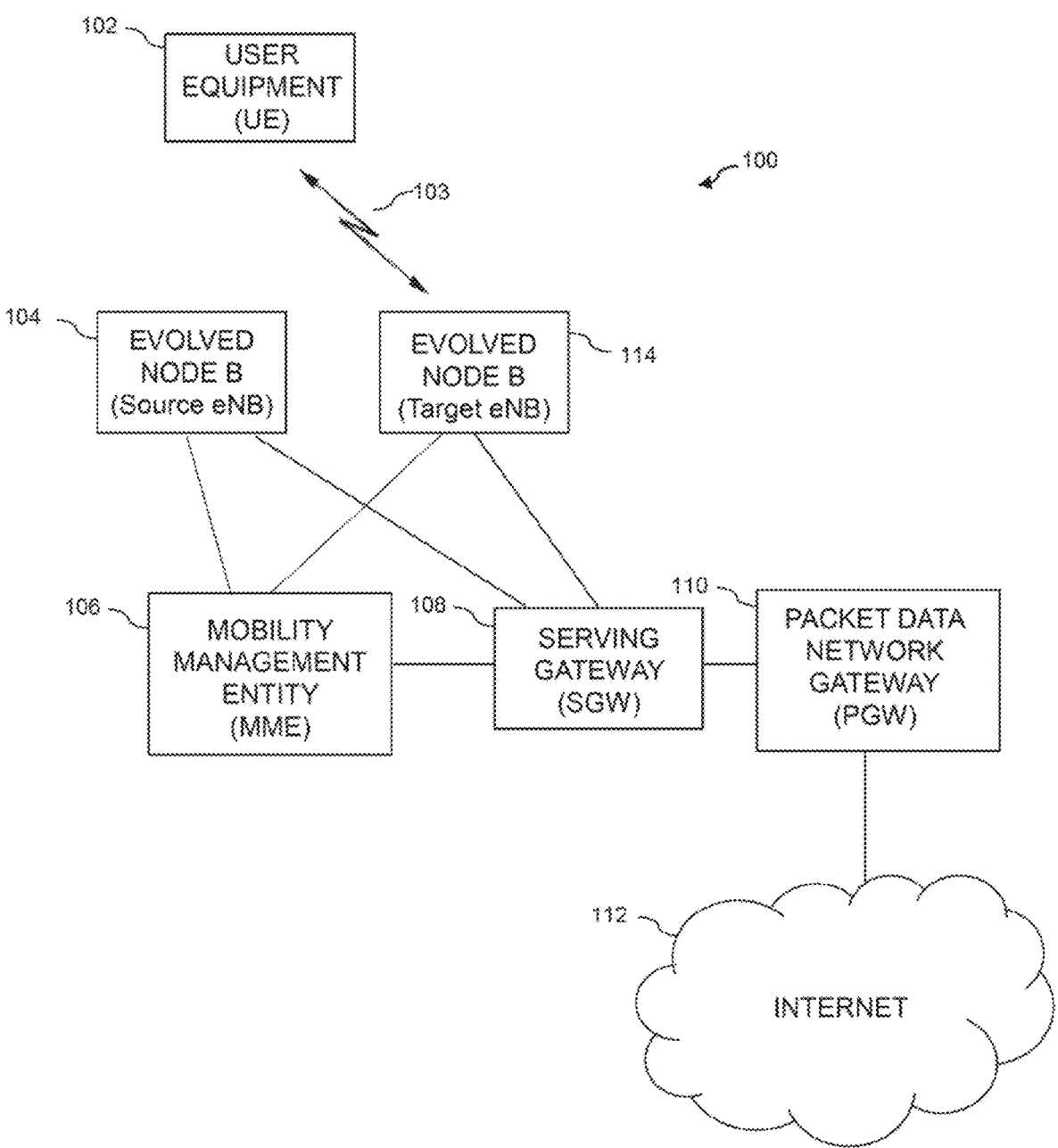

It is to be appreciated that the communication system 100 illustrated in FIG. 1A and FIG. 1B has both eNB 104 and eNB 114 being operatively coupled to the same MME 106 and SGW 108. However, in alternative embodiments, eNB 104 and eNB 114 can each be operatively coupled with different MMEs and/or different SGWs. As will also be explained below, eNB 104 and eNB 114 can actually be the same eNB.

When UE 102 loses connection with source eNB 104 and seeks to re-stablish connection with target eNB 114, illustrative embodiments provide for a secure radio link recovery operation for UE 102 using the existing NAS security context and keys established between UE 102 and MME 106.

Figure 2:
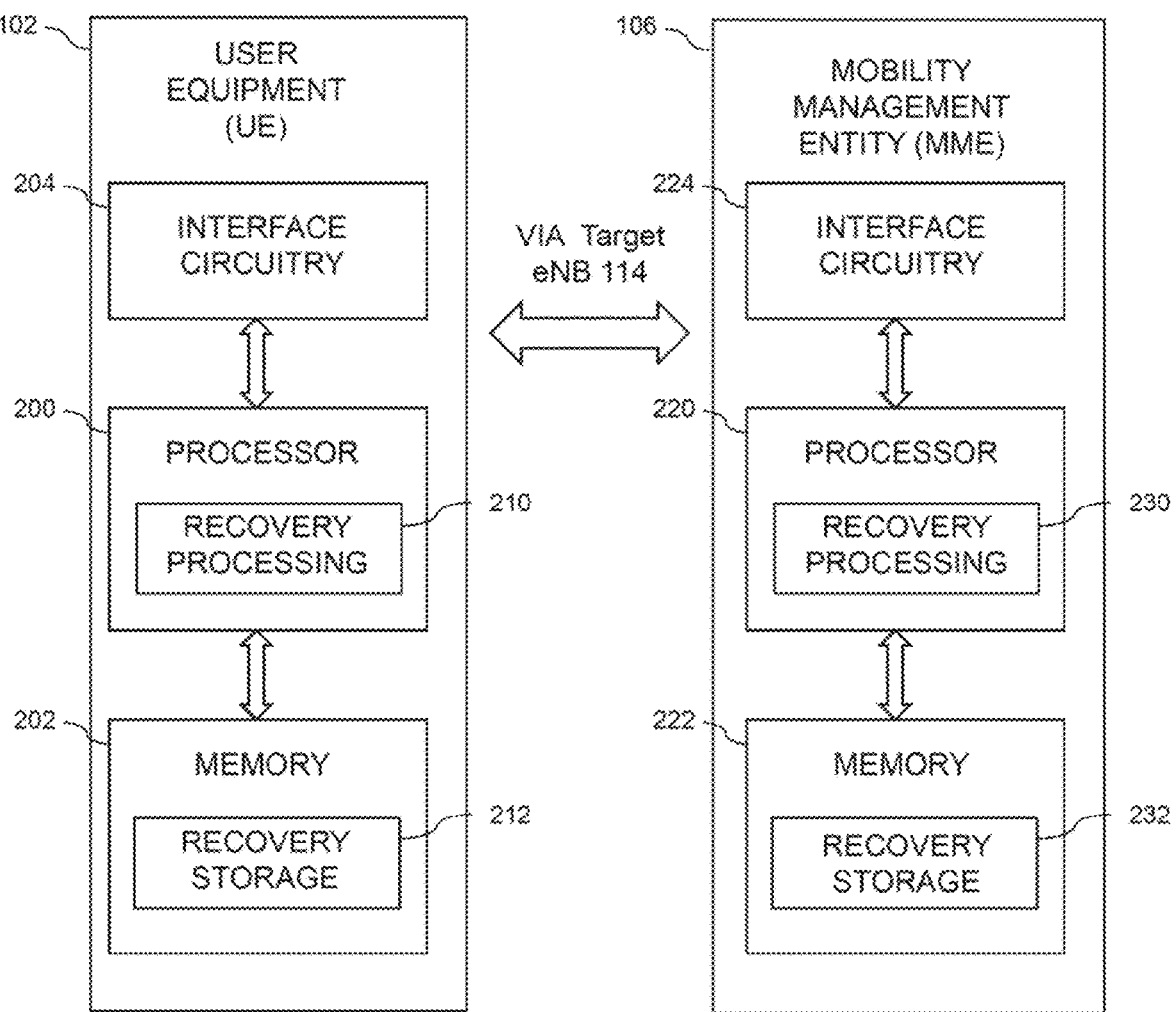
FIG. 2 shows a more detailed view of a user equipment and a mobility management entity element, in accordance with some of the embodiments described herein.

FIG. 2 shows a more detailed view of UE 102 and MME 106 in an illustrative embodiment. The UE 102 comprises a processor 200 coupled to a memory 202 and interface circuitry 204. The processor 200 of the UE 102 includes a recovery processing module 210 that may be implemented at least in part in the form of software executed by the processor 200. By "recovery processing," it is meant to refer to processing steps (operations, processes, executed instructions, etc.) associated with radio link recovery according to one or more illustrative embodiments. More specifically, the recovery processing module 210 performs the user equipment operations of the radio link recovery processes described in conjunction with subsequent figures and otherwise herein. The memory 202 of the UE 102 includes a recovery storage module 212 that stores data generated during radio link recovery operations with the MME 106 through the target NB 114.

The MME 106 comprises a processor 220 coupled to a memory 222 and interface circuitry 224. The processor 220 of the MME 106 includes a recovery processing module 230 that may be implemented at least in part in the form of software executed by the processor. The recovery processing module 230 performs the MME operations in the context of the radio link recovery processes between the UE 102 and the target eNB 114 described in conjunction with subsequent figures and otherwise herein. The memory 222 of the MME 106 includes a recovery storage module 232 that stores data generated during radio link recovery operations with the UE 102 through the target eNB 114.

The processors 200 and 220 of, respectively, the UE 102 and the MME 106 may comprise, for example, microprocessors, application-specific integrated circuits (ASICs), digital signal processors (DSPs) or other types of processing devices, as well as portions or combinations of such elements.

The memories 202 and 222 of, respectively, the UE 102 and the MME 106 may be used to store one or more software programs that are executed by the respective processors 200 and 220 to implement at least a portion of the functionality described herein. For example, radio link recovery operations and other functionality as described in conjunction with subsequent figures and otherwise herein may be implemented in a straightforward manner using software code executed, respectively, by the processors 200 and 220.

A given one of the memories 202 or 222 may therefore be viewed as an example of what is more generally referred to herein as a computer program product or still more generally as a processor-readable (or computer-readable) storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 202 or 222 may more particularly comprise, for example, an electronic random-access memory (RAM) such as static RAM (SRAM), dynamic RAM (DRAM) or other types of volatile or non-volatile electronic memory. The memory 222 may include, for example, nonvolatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 204 and 224 of, respectively, the UE 102 and the MME 106, illustratively comprise transceivers or other communication hardware or firmware that allows the associated system elements to communicate with one another in the manner described herein.

It is apparent from FIG. 2 that UE 102 is configured for communication with the MME 106 and vice-versa via their respective interface circuitries 204 and 224. The UE 102 communicates with the MME 106 via eNB 114. This communication involves UE 102 sending data to the MME 106 via eNB 114 and the MME 106 sending data to the UE 102 via eNB 114.

However, in alternative embodiments, other network elements may be operatively coupled between the UE 102 and the MME 106. The term "data" as used herein is intended to be construed broadly, so as to encompass any type of information that may be sent between user equipment and a core network via a base station element including, but not limited to, radio link recovery data, control data, audio, video, multimedia, data from any sensor device, etc.

It is to be appreciated that the particular arrangement of components shown in FIG. 2 is an example only, and numerous alternative configurations may be used in other embodiments. For example, the user equipment and mobility management entity can be configured to incorporate additional or alternative components and to support other communication protocols.

Other system elements, such as eNB 104, eNB 114, SGW 108, and PGW 110, may each also be configured to include components such as a processor, memory and network interface. These elements need not be implemented on separate stand-alone processing platforms, but could instead, for example, represent different functional portions of a single common processing platform. Such a processing platform may additionally comprise at least portions of an eNB and an associated RNC.

Illustrative embodiments provide radio link recovery for a CIoT UE (e.g., UE 102) that loses connection with a serving or source eNB (e.g., eNB 104) and seeks to re-establish connection with a target eNB (e.g., eNB 114). More particularly, as will be further explained below, illustrative embodiments use existing NAS keys and NAS context between the UE and MME (e.g., MME 106). A temporary AS context in the eNB may be created, in a radio link failure (RLF) scenario in a source eNB 104, until the UE 102 sends an NAS message directly to the MME 106 through a target eNB 114. Certain other embodiments may use alternate keys computed from the existing NAS context parameters or NAS message counts between the UE and the MME to re-establish connection with a target eNB for key separation between regular NAS messages and radio link recovery procedures.

Note that in some embodiments the target eNB 114 may be the same as the source CNB 104, i.e., the UE seeks to re-establish a connection with the same eNB with which the UE lost connection. In such case, that same eNB is a serving or source access node and then a target access node.

The MME 106 retrieves buffered packets at source eNB 104. The MME 106 sets up a new S1AP with target eNB 114 and sends further packets (including retrieved packets from source eNB 104). S1AP is the S1 Application Protocol which serves as the E-UTRAN radio network layer signaling protocol for the S1 interface. S1AP supports the functions of S1 interface by signaling procedures defined in 3GPP TS 36.413, the disclosure of which is incorporated by reference herein in its entirety.

Advantageously, in accordance with illustrative embodiments, there is no other key computation other than one set of NAS keys. The MME 106 verifies the NAS message indicating RLF using the regular NAS integrity key, $K_{NASint}$. NAS security context establishment and key generation, including but not limited to NAS integrity key $K_{NASint}$ and NAS encryption key $K_{NASenc}$, are described in 3GPP TS 24.301 and 3GPP TS 33.401, the disclosures of which are incorporated by reference herein in their entireties. Radio link recovery procedure and key computation are specified in 3GPP TS 36.300, 3GPP TS 36.413 and 3GPP TS 33.401, the disclosures of which are incorporated by reference herein in their entireties.

Figure 3:
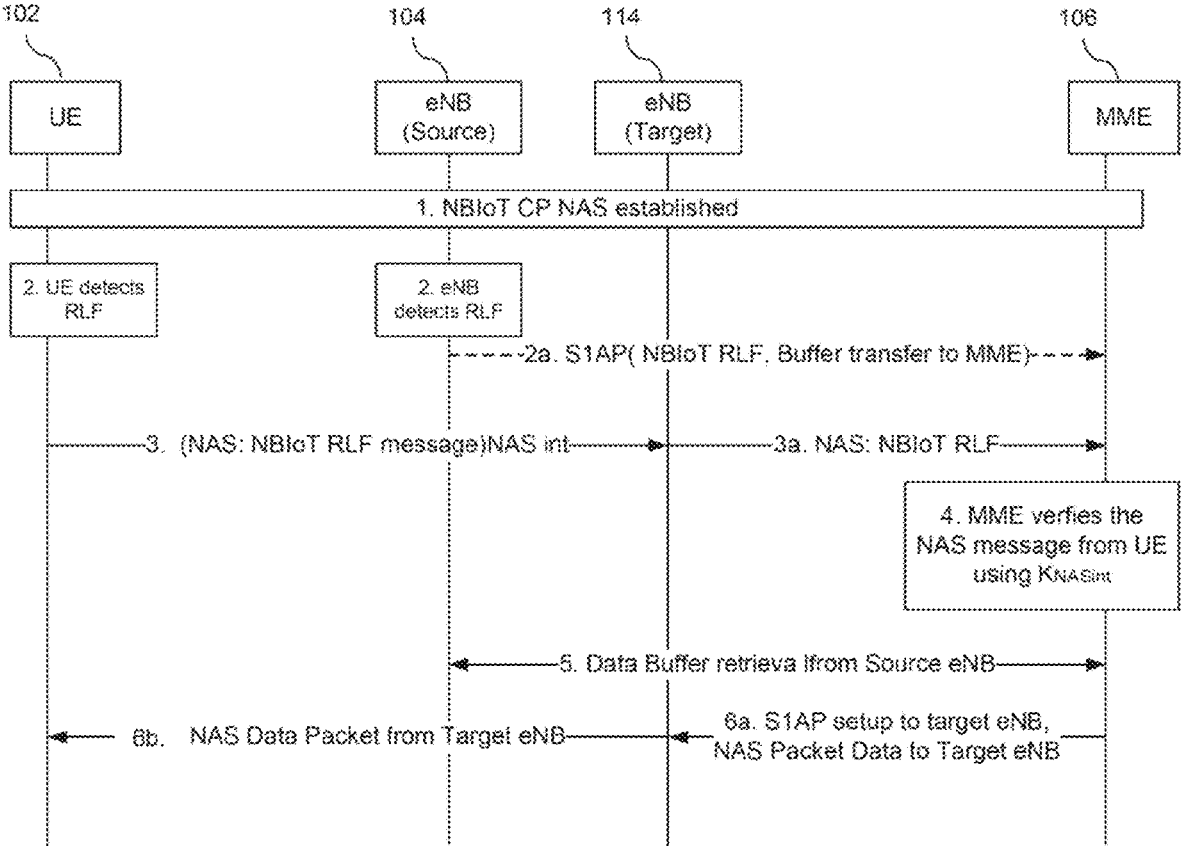
FIG. 3 shows a message flow for a radio link recovery process, in accordance with some of the embodiments described herein.

An illustrative radio link recovery embodiment is described in FIG. 3. More particularly, FIG. 3 shows a message flow for a radio link recovery process for user equipment. It is to be appreciated that the system elements, functions and/or nodes shown in FIG. 3 (UE, eNB (Source), eNB (Target), and MME) correspond to similarly labeled system elements, functions and/or nodes in FIGS. 1A, 1B, and 2. The numbered steps below correspond to the numbers of the message flow in FIG. 3.

1. An CIoT UE 102 (note that "CIoT" may also be referred to as "NBIoT" in the figures and elsewhere herein) seeking to perform control plane (CP) data transfer establishes an NAS link (security context) with MME 106 for data transfer either in the UL or DL. MME 106 sets up a S1AP path to a Source eNB 104 for packet transfer. Note that Source eNB 104 does not have any additional context for the UE 102.

2. During the data transfer, the UE 102 detects a Radio Link Failure (RLF). Additionally or alternatively, the RLF can be detected by the eNB 104 in some cases.

2a. If the eNB 104 detected the RLF, eNB 104 may proactively send the yet to be sent packet data units (PDUs) associated with the data transfer mentioned in step 1) for the UE 102 in its buffer to the MME 106, reporting the RLF with the UE 102 indicated in the S1AP.

3/3a. When the UE 102 detects an RLF, the UE 102 selects a target eNB 114 (note again that this could be the same eNB as Source eNB 104), sends an NAS message to report that it encountered an RLF. The NAS message is protected using the regular NAS integrity key K$_{NASint}$ created as part of the NAS security context with the MME 106 mentioned in step 1.

4. The MME 106 verifies the NAS message using the regular K$_{NASint}$.

5. If the integrity check passes, the MME 106 retrieves unsent residual packets from Source eNB 104 for the UE 102. If the Source eNB 104 had proactively send the residual data in step 2a, this packet transfer is not needed in this step. The MME 106 cancels the S1AP context and path to the Source eNB 104.

6a/6b. The MME 106 sends a new S1AP context set up to the target eNB 114. The MME 106 sends a NAS RLF acknowledgement to the UE 102, along with fresh data, via target CNB 114. The NAS message is integrity protected using the same regular K$_{NASint}$ and data is encrypted using NAS encryption key K$_{NASenc}$ (both created as part of the NAS security context with the MME 106 mentioned in step 1).

Many advantages are realized from radio link recovery techniques according to illustrative embodiments. For example, some of these advantages include, but are not limited to:

i) There is no new context set up to protect the link between the UE 102 and the target eNB 114, only the NAS context between the UE 102 and the MME 106, and NAS keys are used. If key separation from regular NAS messages is desired during radio link recovery, alternate keys may be computed from the current NAS context.

ii) Assumption is that for CIoT UEs, RLF (RRC Connection Re-establishment Request) is processed by an eNB protected by NAS context parameters. A CIoT UE, if it encounters an RLF, either sends a NAS message to the MME (indicating RLF) since they only have a NAS context or sends an RRC Connection Re-establishment Request message to the target eNB protected by the NAS context parameters.

iii) Since the NAS message or RRC Connection Re-establishment Request message is protected, neither attacks using these messages, nor path switch to another eNB, are possible.

iv) In case only NAS messages are used, changes at the existing elements, functions and/or nodes of the network are very minimal, i.e., two NAS messages between the UE 102 and the MME 106 to report and acknowledge back an RLF, two S1AP messages between the MME 106 and an eNB for buffer packet retrieval and S1AP path change.

v. The UE 102 uses only NAS context in the entire operation.

vi. The MME 106 does not need to transfer an NAS algorithm or identifier to other nodes.

Accordingly, in general, in response to a radio link failure between given user equipment (e.g., UE 102) and a source access node (e.g., eNB 104) of a communication system (e.g., 100) during a data transfer operation over a control plane, the process recovers the radio link for the given user equipment through a target access node (e.g., eNB 114) of the communication system. The radio link recovery is enabled via a mobility management node (e.g., MME 106) of the communication system using a NAS security context previously established between the given user equipment and the mobility management node.

For example, as illustrated in FIG. 4, a radio link recovery process according to an illustrative embodiment comprises the following steps.

In step 400, the mobility management node receives a first NAS message from the given user equipment. The first NAS message indicates that the given user equipment has experienced an RLF with the source access node, and is protected using a cryptographic key (e.g., NAS integrity key K$_{NASint}$) created during previous establishment of the NAS security context between the given user equipment and the mobility management node.

In step 402, the mobility management node verifies the given user equipment using the cryptographic key (K$_{NASint}$).

In step 404, the mobility management node initiates set up of a signaling interface (e.g., S1AP) with the target access node.

In step 406, the mobility management entity sends a second NAS message to the given user equipment through the target access node. The second NAS message indicates an acknowledgment of the RLF and is protected using the cryptographic key (K$_{NASint}$) created during previous establishment of the NAS security context between the given user equipment and the mobility management node. The second NAS message contains data associated with the data transfer. The data is previous buffered data and/or new data. The data is encrypted using another cryptographic key (NAS encryption key K$_{NASenc}$) created during previous establishment of the NAS security context between the given user equipment and the mobility management node.

Also in certain embodiments, for the sake of key separation between different procedures, alternate keys may be computed using NAS context parameters along with uplink message counts or downlink message counts.

In this alternate key embodiment, the NBIoT UE uses another key 'K$_{RLFint}$' to protect the uplink NAS message to the MME which reports the RLF. As shown in the key derivation function (KDF) in FIG. 5A, the key calculation uses NAS Uplink Count parameter and K$_{NASint}$ along with the current K$_{ASME}$. Since the NAS uplink count is included in every uplink NAS message, the receiver can use the count value in the received message to calculate the integrity key K$_{RLFint}$ and avoid any mis-synchronization of message counts in radio link failure situations. This can help in proper security and count verification of the radio link failure message where multiple messages may be transmitted during unsteady radio conditions. It is possible to use 'NAS downlink count' also by the MME 106 in a downlink message for better synchronization during RLF occasions.

Figure 5A:
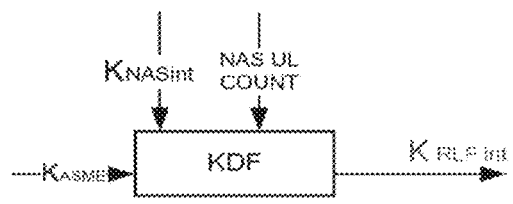
FIGS. 5A and 5B show a key computation and message flow for a radio link recovery process, in accordance with some of the embodiments described herein.
Figure 5B:
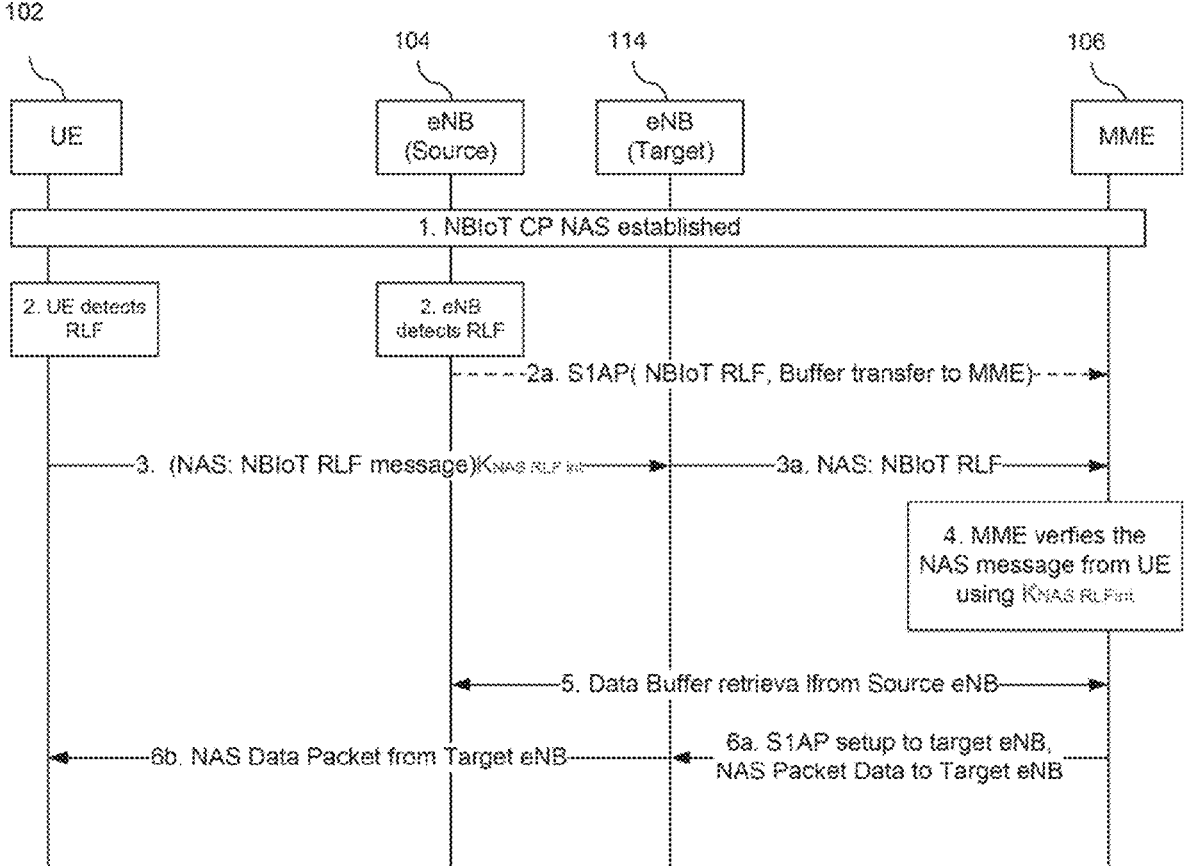

Thus, the message flow shown in FIG. 5B is the same as that shown in FIG. 3 for steps 1, 2, 2a, 3a, 5, 6a and 6b, but with respect to steps 3 and 4, instead of the regular key K$_{NASint}$, the UE 102 uses K$_{RLFint}$ (e.g., derived as shown in FIG. 5A) to integrity protect the message to report the RLF.

It is to be appreciated that the naming of network elements mentioned herein are for illustrative purposes only. As such, none of the specific names or acronyms given to these network elements herein are intended to limit embodiments in any manner.

As indicated previously, the embodiments are not limited to the LTE context and the disclosed techniques can be adapted in a straightforward manner to a wide variety of other communication system contexts including, but not limited to, other 3GPP systems and non-3GPP systems.

The processor, memory, controller and other components of a user equipment or base station element of a communication system as disclosed herein may include well-known circuitry suitably modified to implement at least a portion of the radio link recovery functionality described above.

As mentioned above, embodiments may be implemented in the form of articles of manufacture each comprising one or more software programs that are executed by processing circuitry of user equipment, base stations or other elements of a communication system. Conventional aspects of such circuitry are well known to those skilled in the art and therefore will not be described in detail herein.

Also, embodiments may be implemented in one or more ASICS, FPGAs or other types of integrated circuit devices, in any combination. Such integrated circuit devices, as well as portions or combinations thereof, are examples of "circuitry" as that term is used herein.

A wide variety of other arrangements of hardware and associated software or firmware may be used in implementing the illustrative embodiments.

It should therefore again be emphasized that the various embodiments described herein are presented by way of illustrative example only and should not be construed as limiting the scope of the claims. For example, alternative embodiments can utilize different communication system configurations, user equipment configurations, base station configurations, radio link recovery processes, messaging protocols and message formats than those described above in the context of the illustrative embodiments. These and numerous other alternative embodiments within the scope of the appended claims will be readily apparent to those skilled in the art.

What is claimed is:

1. A mobility management entity (MME) in a communication system, the MME being operable to recover a radio link, the MME comprising:

at least one processor; and at least one memory storing instructions thereon that, when executed by the at least one processor, cause the MME to perform at least:

after a non-access stratum (NAS) security context has been established for communication between the MME and a user equipment (UE) in a communication system, during a data transfer operation over a control plane and in response to a radio link failure between the UE and a source access node of the communication system, receiving, from the UE, via a target access node of the communication system, a message indicating that the radio link failure has occurred, the target access node being different than the source access node, the message received via the target access node being protected using a first key associated with the NAS security context previously established between the UE and the MME;

verifying the UE using the first key associated with the NAS security context previously established between the UE and the MME;

retrieving, from the source access node, data that previously failed to be delivered to the UE when the radio link failure occurred during the data transfer operation over the control plane between the MME and the UE;

initiating set-up of a signaling interface with the target access node;

recovering a radio link for the UE by sending a second message to the target access node, the second message being protected using a second key associated with the NAS security context previously established between the UE and the MME, the second message comprising the data that previously failed to be delivered to the UE when the radio link failure occurred during the data transfer operation over the control plane between the MME and the UE.

2. The MME of claim 1, wherein the instructions stored on the at least one memory, when executed by the at least one processor, further cause the MME to perform at least:

establishing the NAS security context for communication between the MME and the UE;

generating the first and second keys associated with the NAS security context established between the MME and the UE; and providing the first and second keys to the UE.

3. The MME of claim 1, wherein the second key is a cryptographic key associated with the NAS security context previously established between the UE and the MME, and wherein the second message is protected using the cryptographic key associated with the NAS security context previously established between the UE and the MME.

4. The MME of claim 1, wherein the first key is an integrity key associated with the NAS security context previously established between the UE and the MME.

5. The MME of claim 4, wherein the verifying the UE is carried out using the integrity key associated with the NAS security context previously established between the UE and the MME.

6. The MME of claim 4, wherein the integrity key is generated using at least an uplink message count or a downlink message count.

7. The MME of claim 4, wherein the instructions stored on the at least one memory, when executed by the at least one processor, further cause the MME to perform at least:

verifying, using the integrity key, the message received from the UE.

8. The MME of claim 1, wherein the second key is an encryption key created during establishment of the NAS security context previously established between the UE and the MME.

9. The MME of claim 1, wherein the communication system comprises a Narrow Band Internet of Things (NB-IoT) network and the UE comprises a cellular IoT UE.

10. A user equipment (UE) comprising:

at least one processor; and at least one memory storing instructions thereon that, when executed by the at least one processor, cause the UE to perform at least:

during a data transfer operation over a control plane between a mobility management entity (MME) of a communication system and the UE, in response to a radio link failure occurring between the apparatus and a source access node, generating a first message indicating that the radio link failure has occurred between the UE and the source access node of the communication system, the first message being protected using a first key associated with a non-access stratum (NAS) security context previously established between the UE and the MME of the communication system, the first message indicating that the radio link failure has occurred;

transmitting, to the MME, via a target access node, the first message indicating that the radio link failure has occurred between the UE and the source access node to initiate recovery of a radio link for the UE, the target access node being different than the source access node; and receiving, in response to the first message, from the MME, via the target access node, a second message protected using a second key associated with the NAS security context previously established between the UE and the MME, the second message comprising data that previously failed to be delivered to the UE when the radio link failure occurred during the data transfer operation over the control plane between the MME and the UE.

11. The UE of claim 10, wherein the receiving the second message comprises receiving, in the second message, from the MME, via the target access node, the data that previously failed to be delivered to the UE when the radio link failure occurred during the data transfer operation over the control plane between the MME and the UE.

12. The UE of claim 10, wherein the first key is an integrity key associated with the NAS security context previously established between the UE and the MME.

13. The UE of claim 10, wherein the first message comprises information regarding a NAS count.

14. The UE of claim 10, wherein the instructions stored on the at least one memory, when executed by the at least one processor, further cause the UE to perform at least:

requesting establishment of the NAS security context between the UE and the MME in the communication system; and receiving, from the MME, via the source access node, with an indication that the NAS security context has been established between the UE and the MME in the communication system, at least one key associated with the NAS security context established between the UE and the MME.

15. The UE of claim 10, wherein the radio link failure is detected by the UE.

16. The UE of claim 10, wherein the radio link failure is detected by the source access node.

17. The UE of claim 10, wherein an access stratum (AS) security context is not established between the UE and the source access node.

18. The UE of claim 10, wherein the communication system comprises a Narrow Band Internet of Things (NB-IoT) network, and wherein the UE comprises cellular IoT (CIOT) UE.

19. The UE of claim 10, wherein the source access node comprises a first base station and the target access node comprises a second base station, the first and second base stations being distinct from each other and distinct from the MME of the communication system.

20. A Cellular Internet-of-Things (CIOT) user equipment configured for receiving data in a Narrow Band IoT (NB-IoT) network via a radio link, the CIOT user equipment comprising:

at least one processor; and at least one memory storing instructions thereon that, when executed by the at least one processor, cause the CIOT user equipment to perform at least:

requesting establishment of a non-access stratum (NAS) security context between the user equipment and a mobility management entity (MME) of the communication system;

receiving, from the MME, with an indication that the NAS security context has been established between the user equipment and the MME, an integrity key or information regarding the integrity key, the integrity key being created during establishment of the NAS security context between the user equipment and the MME;

in response to a radio link failure (RLF) occurring between the user equipment and a source access node of the communication system during a data transfer operation over a control plane between the MME and the user equipment, initiating recovery of the radio link by sending a first message to the MME through a target access node of the communication system, without using the source access node to relay the first message, while maintaining the NAS security context previously established between the user equipment and the MME, wherein the first message is integrity protected using the integrity key created during establishment of the NAS security context between the user equipment and the MME, and wherein the target access node is different from the source access node; and receiving, from the target access node, a second message protected using the integrity key associated with the NAS security context previously established between the user equipment and the MME, the second message comprising data that previously failed to be delivered to the user equipment when the RLF occurred during the data transfer operation over the control plane between the MME and the user equipment.

* * * * *